United States Patent
Post

[11] Patent Number: 5,882,087
[45] Date of Patent: Mar. 16, 1999

[54] QUICK RELEASE IN-LINE SKATE WHEEL AXLE

[76] Inventor: Peter Post, 3167 7th St., Boulder, Colo. 80304-2511

[21] Appl. No.: 778,697

[22] Filed: Jan. 3, 1997

[51] Int. Cl.[6] .................................................. B60B 27/00
[52] U.S. Cl. .......................... 301/5.3; 301/5.7; 301/110.6
[58] Field of Search .............................. 301/5.3, 5.7, 111, 301/110.5, 110.6, 120, 114

[56] References Cited

U.S. PATENT DOCUMENTS

| | | | |
|---|---|---|---|
| 612,401 | 10/1898 | Collmer | 301/110.5 X |
| 3,360,314 | 12/1967 | Loreto | 301/5.7 X |
| 3,785,670 | 1/1974 | Smith | 301/114 X |
| 5,271,633 | 12/1993 | Hill, Jr. | 301/5.7 X |
| 5,314,199 | 5/1994 | Olsen et al. . | |
| 5,388,846 | 2/1995 | Gierveld . | |
| 5,588,658 | 12/1996 | Perner et al. . | |
| 5,595,392 | 1/1997 | Casillas . | |
| 5,601,299 | 2/1997 | Yun et al. . | |
| 5,601,342 | 2/1997 | Perner et al. . | |
| 5,630,652 | 5/1997 | Cech et al. . | |

FOREIGN PATENT DOCUMENTS 609873 1/1912 France ................................ 301/110.6

*Primary Examiner*—Russell D. Stormer
*Attorney, Agent, or Firm*—Emery L. Tracy

[57] ABSTRACT

An axle for in-line roller wheels allowing quick release of the wheels and axle from the in-line skate blade frame. The axle is constructed and arranged to allow the distal ends of the axle to move longitudinally relative to each other. There is a spring or other such mechanism forcing the ends of the axle into the openings in the blade frame. The ends of the axle that protrude into the frame are designed not to protrude beyond the outer sides of the frame structure so that the ends of the axle are not subject to wear. The present invention provides for an in-line skate axle that is secure and never needs tightening. Since the wheels are retained by springs there are no bolts or threaded connections to become loose. Other types of construction retain the axle and wheel in the blade frame using spring forces in tension rather than compression. In such arrangements the spring is stretched through the axle and the end retainers are pulled into place thereby retaining the axle and wheel to the frame. Other such arrangements such as bayonet type retaining locks may be used to advantage in the present invention.

6 Claims, 4 Drawing Sheets

QUICK RELEASE IN-LINE SKATE WHEEL AXLE

BACKGROUND OF THE INVENTION

1. Field of the Invention

The present invention relates generally to roller skates and more particularly to the axles and wheels of in-line skates.

2. Description of the Prior Art

In-line roller skating has become a popular activity, and following this activity manufacturers have developed new and improved in-line skates. In conjunction with this development there have been many patents filed. There are patents focused on removing the blade from the boot. But no patents or improvements that provide for quick release of the individual wheels and/or axles of an in-line skate are known.

Traditional methods of attaching the wheel to the blade frame use a bolt axle bolted to the blade frame. The bolt heads are positioned outside the frame and are subjected to extreme wear since the bolt head comes into contact with the pavement when the in-line skate is angled during turns or scraped along by the user. In fact often the bolt heads become so worn that they cannot be removed using a wrench. In any case the bolts must be tightened to the frame using two wrenches one on each side. There may be other designs where the wheels are riveted to the frame and are essentially not removable from the blade frame.

This problem of nut and/or bolt wear has been addressed in at least one prior art design. In this design the axle itself is a bolt with a threaded tip, and the frame hole is tapped with a matching thread to receive the axle tip. In this design the axle tip need not extend through to the outside of the frame leaving nothing exposed to the wear described above. However, the bolt head must be recessed to prevent wear to the bolt head. However, this design requires tools for tightening, and re-tightening during use is often required.

U.S. Pat. No. 5,388,846 ('846) is an illustration of prior art regarding a bolt on wheel, see FIG. 1 (which is a represented in FIG. 13 of the '846 patent). There is a tapped axle that extends beyond the outer surface of the frame extension to which the wheel assembly is to be securely mounted. Two bolts 2 are threaded onto the ends of the axle securely attaching the axle to the frame extensions. There is a tubular spacer 6 that may be part of the wheel assembly. The spacer is between the inner surfaces 8 of the frame extension with the axle running therethrough.

There are two enclosed ball bearing assemblies 5 with the ball retained within a raceway. The inner raceway 3 rests on the spacer 6 so that the ball bearing can rotate freely around the spacer. The outer raceway 5 is formed in a ring that fits into or may be part of the wheel hub 7. In this assembly the wheel rotates via the ball bearings and the bolts are tightened to securely retain the spacer and the wheel via the ball bearings to the frame extensions. Also, the bolts may be retained in recessed parts of the frame (also not shown). Also, it is possible to have the axle threaded into tapped holes in the two opposing frame opening so that no bolt or nut is needed.

Other in-line roller wheels may be retained to the blade using bushings and other such methods as are known in the art.

Also prior art discloses systems where the in-line skate itself is disconnectable from the boot. U.S. Pat. No. 5,314, 199 to Olsen et al. shows such a device.

All of the above designs require tools to disconnect the wheels from the frame, if at all.

It is an object of the present invention to provide a system where the individual wheels can be quickly and easily removed from the blade frame manually.

It is another object of the present invention to provide a more reliable attachment of the wheel in the in-line skate where the wheel never needs tightening.

SUMMARY OF THE INVENTION

The above objects are met in the present invention, a quick-release axle/spacer for in-line skate wheels. That is, it provides a secure mechanism for retaining the wheel assembly in the blade; requires no tools to install; allows a user to install an in-line skate wheel with one hand in a matter of seconds; and will not be subject to extreme wear.

The present invention provides an axle where the distal ends of the axle move relative to each other along the longitudinal axis of the axle. The ends are arranged and designed to extend into the opposing holes in an in-line skate blade frame that straddles the wheel. There is a means for urging or forcing the ends apart, and the axle portion that resides between the frame members is arranged and constructed to accommodate a wheel hub allowing substantially free rotation of the wheel. The ends of the axle can be depressed manually to slip the wheel and axle out from between the straddling frame members.

The present invention in another preferred embodiment provides an axle that is formed from two telescoped tubular structures. One tube sliding within another. The ends of the tubes are arranged to extend through the opposing apertures in a blade frame to secure the wheel assembly to the frame. There is a spring or other such means within the tubes that forces or urges the tubes apart. The axle may be provided with raceways for ball bearings or for the placing of a ball bearing assembly that may be part of the wheel itself. In other preferred embodiment there may be accommodations for a bushing or other such rotating structures as are known in the art.

In another preferred embodiment the force that urges the ends of the axle apart may be implemented with a coiled spring, or with an elastomer that may fill (or not) the inside cavity of the axle. Another implementation may use a spring washer or a slit-washer that provides a spring force. Such washers may be placed in the axle and construction of the axle may be made to utilize such washers as spring forces. Yet another type of spring-force may be found from a wish-bone or leaf type of spring configuration designed to fit in an axle. Other mechanisms that provide force that may be used to advantage within the present invention include gas filled bladders or magnetic poles that attract or repell each other.

In another preferred embodiment a single tube cylinder is provided. Raceways or other artifacts may be provided to accommodate ball bearings or bushings and the like as described above that would be needed for the wheel. A spring means may be provided within the tube where the spring itself has end caps that are driven outward to extend through the ends of the tube and into the frame apertures as discussed above for the telescoping axle. The ends of the tube have retaining extensions or structures that mate with flanges on the caps that retain the spring within the tube. The tube may be in two threaded parts which can be opened to allow the spring to be inserted. The tube parts are then threaded together forming the tube. The two caps extend from the ends of the tube and are of dimensions to retain the axle to the frame in a sturdy strong fashion. Such dimension and materials to accommodate the forces involved are known in the art.

In another preferred embodiment the spring retaining the wheel in the in-line frame is in tension. Here there may be a hollow bolt configuration where a spring is attached within the cavity to the head of the bolt. The distal end of the spring is connected to a rod that is positioned co-axial with the bolt. The bolt is inserted through the in-line frame and the wheel hub and extends through the opposite frame. The rod is pulled out of the bolt cavity and rotated to be cross-wise to the bolt. The spring is in tension and pulls the rod back. However, since the rod is cross-wise the rod contacts the outside of the wheel frame thereby retaining the wheel in the in-line frame. Other modifications of this arrangement where the spring is in tension may be made. Such modifications might have the spring external to the bolt, if the wheel has apertures through which the spring might be threaded. The ends that extend beyond the frame may be recessed in a preferred embodiment to prevent wear.

In another preferred embodiment the axle may be constructed from two magnets with thin retaining heads. The magnets are inserted from the outside surface of the holes in the in-line skate frame holes. One magnet has a north pole at the end being inserted and the other magnet a south pole so that the two poles attract each other holding the magnets and so the axle in place. The heads are thin to diminish possible wear. However, another preferred embodiment may have a single magnetized axle with no retaining heads. In this case the ends of the magnet-axle are flush with the outer sides of the frame so no wear will occur. The magnet itself will tend to stay aligned and centered in the frame.

Advantages of the present invention over part or all of the prior art are that installation or removal of in-line wheel 12 incorporating the present invention can be accomplished in seconds, with one hand, without ancillary tools.

Other objects, features and advantages will be apparent from the following detailed description of preferred embodiments thereof taken in conjunction with the accompanying drawings in which:

DETAILED DESCRIPTION OF PREFERRED EMBODIMENTS

Figure 1:
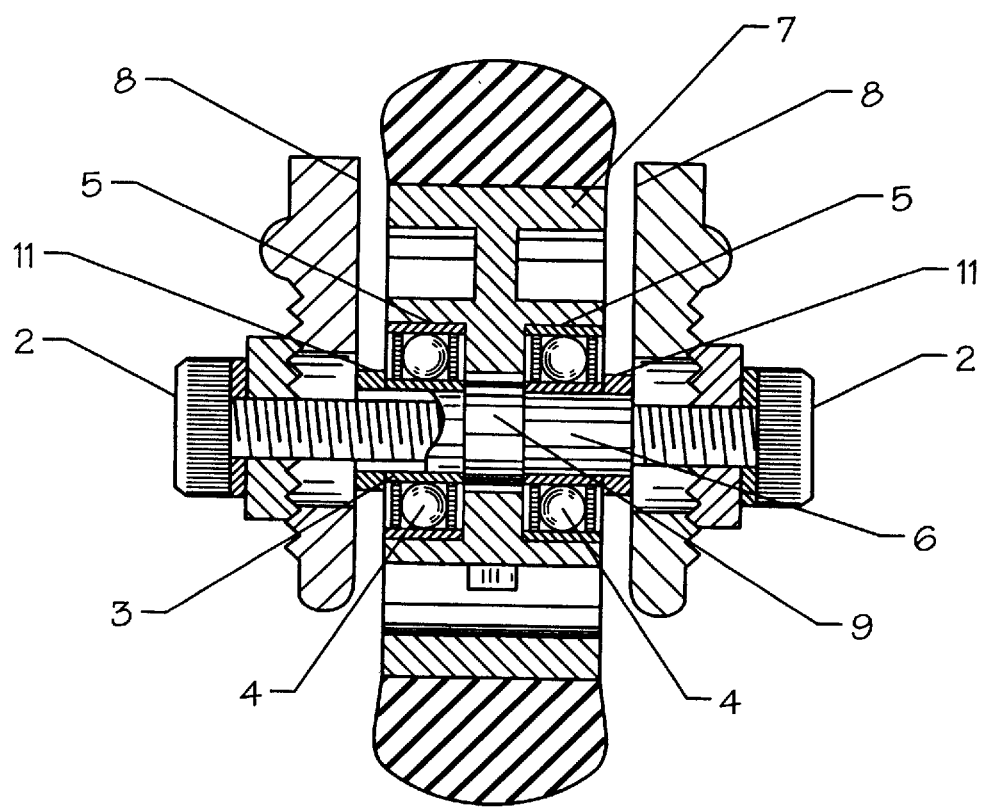
FIG. 1 is a sectioned diagram of a prior art in-line skate wheel assembly.

FIG. 1 is a prior art in-line skate wheel assembly as discussed above. The dimensions of this unit as illustrative of the dimensions of the present invention. The width between the inner surfaces 8 of the frame is about one inch, each spacer 11 is about 1/16 inch wide, each of the ball bearings 4 are about 1/4 inch wide, and the space between the ball bearings which matches the width of the construct 9 on the axle is about 3/8 of an inch.

Figure 2A:
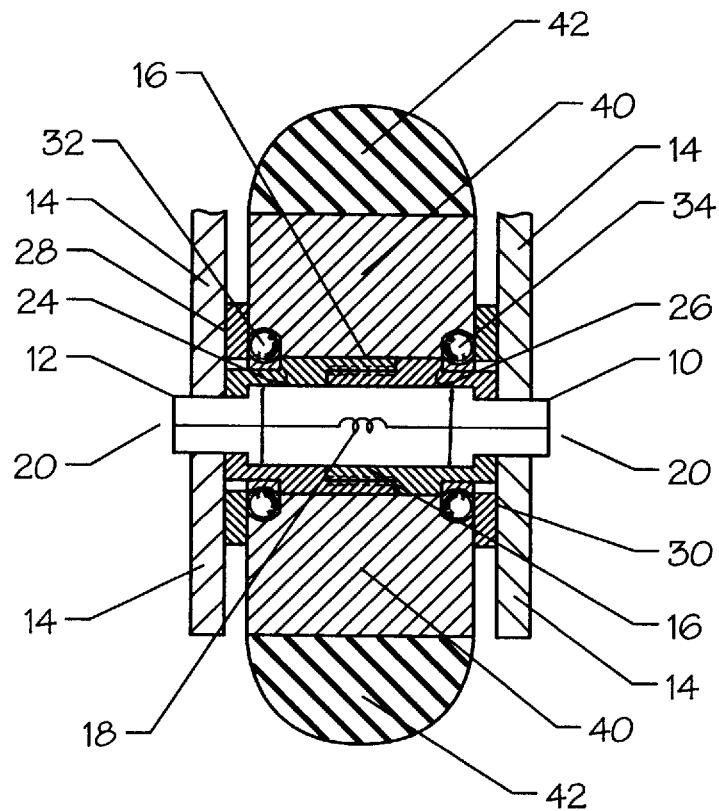
FIG. 2A is a sectioned view of a preferred embodiment of the present invention.

FIG. 2A shows the present invention in one preferred embodiment. A tubular structure 10 extends through the in-line skate frame 14 and telescopes into the opposing tubular structure 12 at location 16. There is a spring 18 attached to the blind ends of the tubes forcing the tube apart and forcing the ends of the tubes into apertures 20 and 22 in the frame.

Still referring to FIG. 2A, the tube 12 has a shoulder 24 and tube 10 a shoulder 26 that are designed and constructed to mate with ball bearings 32 and 34 that may be part of the roller wheel hub itself, or the bearing may be a separate assembly fixed to the roller wheel hub. Spacers 30 and 32 may be provided in another preferred embodiment between the frame 14 inner surfaces and the ball bearing. These spacers may be made as part of the axle itself or separate pieces. An advantage of the present invention over the prior art in this regard is that this action of shoulders 24 and 26 and the spacers 30 and 32 is to fill the space that may be present due to variation inherent in manufacturing of the frame and the wheel. These variations are a cause of wheel wobble which causes instability and increased wheel and axle wear.

Still referring to FIG. 2A the outer frames of the bearings may be part of the wheel hub 40 to which the friction material 42 is attached.

Figure 2B:
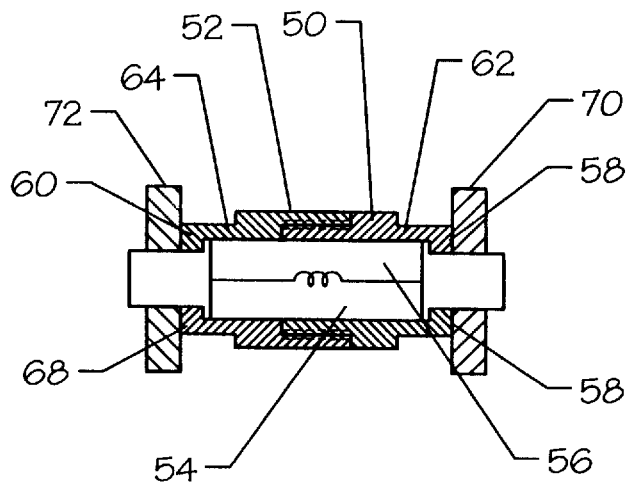
FIG. 2B is an alternative design of the axle/spacer.

FIG. 2B shows another preferred embodiment of the present invention where there are two tubular parts 50 and 52 threaded together forming a single tube with an internal chamber 54. The tube ends with lips 58 and 60 around the internal diameter forming a smaller internal diameter of the opening than the internal diameter of the inner chamber of the tube. The tube may have the shoulders 64 and 66 to accommodate the ball bearings as described above. As in FIG. 2A,there may be spacers 70 and 72 to allow the wheel to spin within the frame extension.

Figure 3:
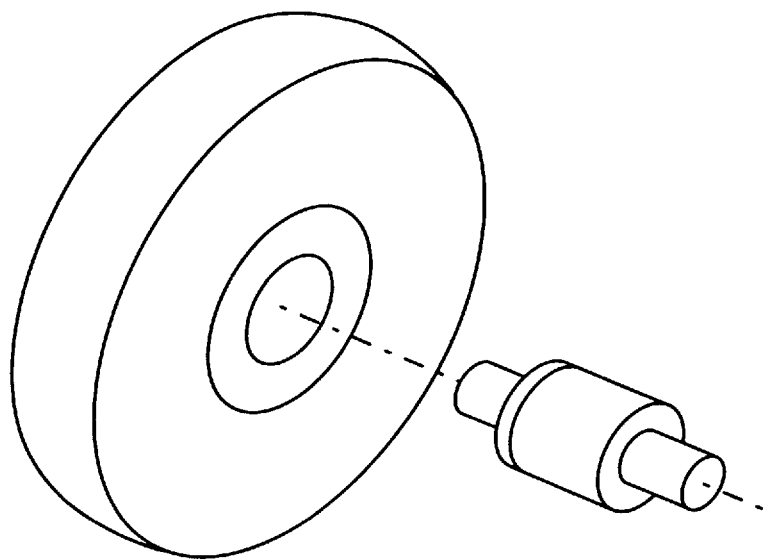
FIG. 3 shows the orientation as the axle is inserted into the wheel assembly.

FIG. 3 shows the wheel with the axle being inserted.

Figure 4:
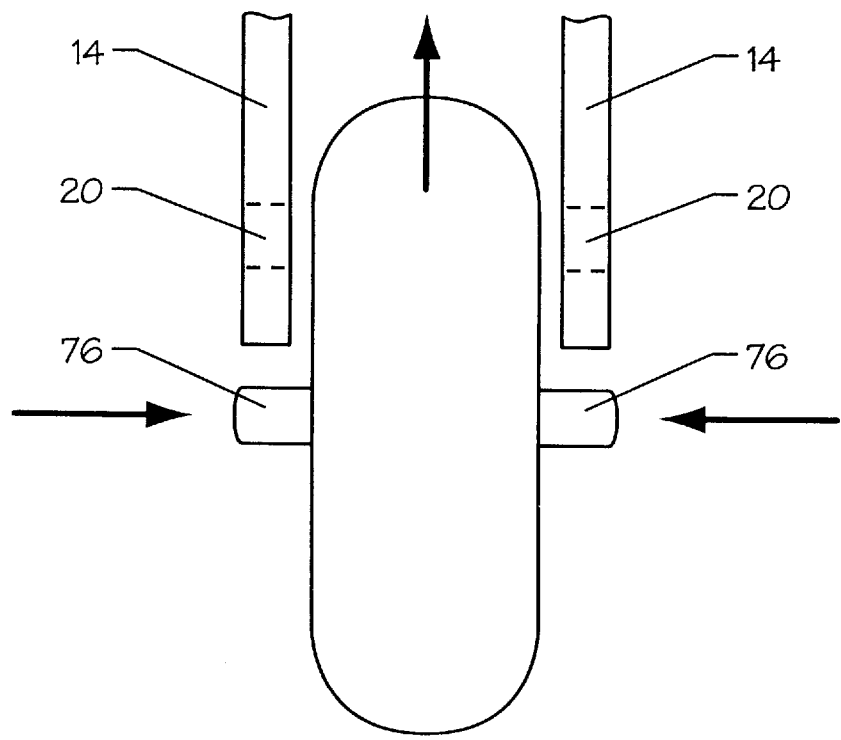
FIG. 4 shows the axle and wheel as being inserted within a in-line skate frame.

FIG. 4 shows a tools-free installation of the wheel into the blade frame. A user squeezes the axle tips 76 together and slides the wheel between frame sidewalls 14 until axle tips spring out into opposing apertures 20 and 22. To remove the in-line skate wheels 12 a user squeezes axle tips 76 together until the axle tips clear the inner dimension 80 between the frame extensions 14.

Figure 5:
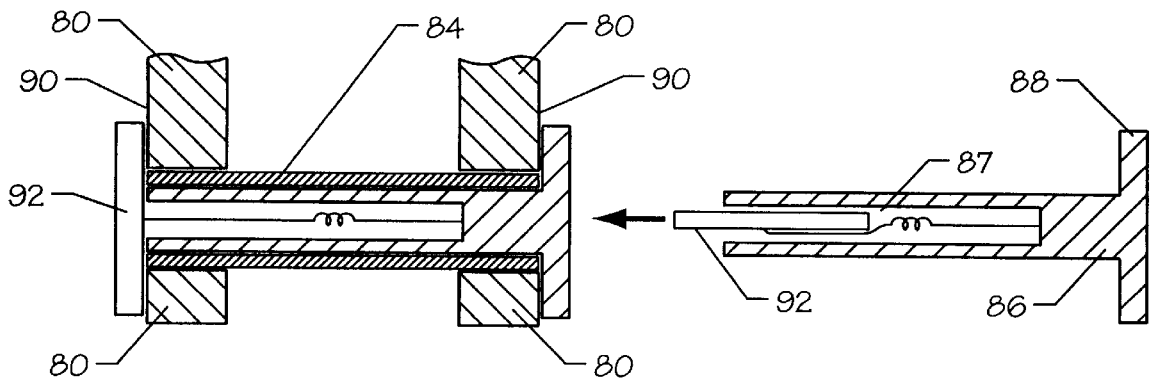
FIG. 5 shows an embodiment with a spring in tension.

FIG. 5 is sectioned preferred embodiment wherein the internal spring force is in tension holding the wheel to the blade frame 80. The insert 82 is shown before insert with the arrows indicating the direction. FIG. 5 shows a sleeve 84 which need not be present, the insert can slip though the wheel hub and/or bearings or bushings (not shown) directly. There is a housing 86 with a cavity 87 and a capped end 88 which abuts the outside of the frame 90 when inserted. A bar 92 is retained in the cavity. When inserted the bar may be pulled out and rotated ninety degrees to block removal of the insert. There may be recesses (not shown) in the frame outer surfaces 90 and 90' that allow the bar and the capped end to lie flush with those outer surfaces of the frame.

Figure 6:
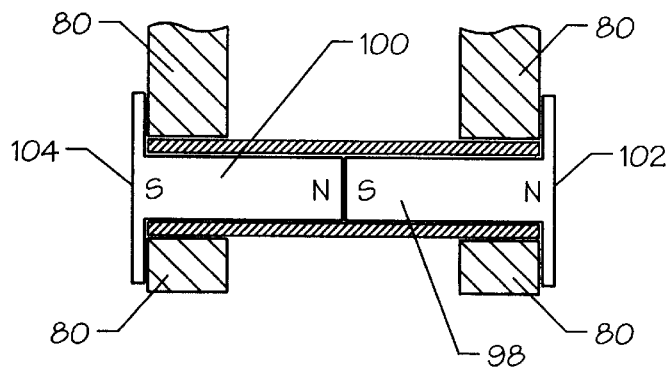
FIG. 6 is an embodiment using magnets.

FIG. 6 shows two magnets 98 and 100 with attracting poles that urge the magnets together. Each magnet has a thin head 102 and 104 that abuts the outer surface of the in-line skate frame 80 and 80'.

Figure 7:
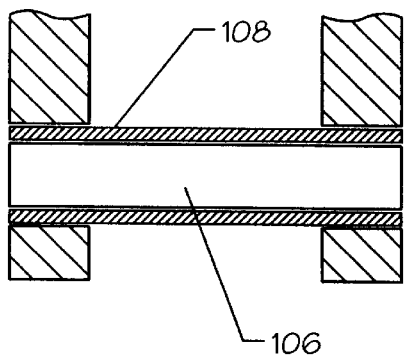
FIG. 7 shows another pinned endcap with magnets.

FIG. 7 shows a one piece magnet axle 106 with the ends flush with the two outer surfaces of the frame. The materials comprising the frame and the sleeve 108 must be magnetic material. In these conditions the magnet will be retained within the sleeve. The sleeve may be incorporated into the magnet in another preferred embodiment.

Figure 8:
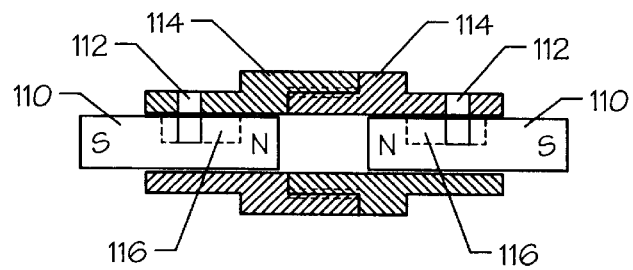
FIG. 8 is a sectioned view of another embodiment of the present invention.

FIG. 8 shows a preferred embodiment where the end caps 110 and 110' are magnets arranged with opposing poles arranged to drive the magnets apart. The end caps are so forced into the apertures in the frame (not shown in the FIG.). There are pins 112 and 112' set through the sleeves 14 and 114' into the caps 110 and 110'. There is formed in each cap a channel 116 and 116' where the pin may move longitudinally allowing each cap 110 and 110' to move longitudinally relative to each other enough to clear the frame inner surface spacing at the frame apertures to allow the wheel to be inserted or removed. Alternatively the channel may be in the sleeves 114 and 114'. The channels allow motion of the end caps to be flush with the outer surface of the frame at the apertures. But, as noted above, there is enough movement to allow the caps to be moved towards each other enough to clear the inner surface of the frame at the apertures.

Other methods include bayonet type mechanisms and, as discussed above, spring washer mechanisms, and preferred embodiments where either spring compression or tension may be used to retain the axle and wheel to the blade frame while allowing manual quick release of the axle and wheel. Other types of springs and spring material may be, for example, an elastomer or rubber material placed in the axle, a gas or fluid filled bladder, or even magnets with opposing poles might be used in place of a spring in compression to provide a force that drives the poles apart. Like poles would be equivalent to a spring in tension. Other spring forces can be found in particular types of washer designs, e.g. split and beveled.

The preferred embodiments shown herein described cylindrical axles. But, although the axles are designed and constructed to accommodate a rotating wheel with ball bearing, bushings and the like, the axle need not be cylindrical throughout its length. Square sectioned or keyed parts of the axle, so as to fit into the frame holes on a particular orientation prohibiting axle rotation, may be used to advantage in the present invention. In addition, the construction of the axle to allow relative longitudinal movement of the two ends may be accomplished with axles that are not fully cylindrical as are known in the art. For example, a spaced tongue and groove arrangement where the tongue may move to and from in the groove with a spring force arranged to drive the tongue out of the groove may be used to advantage. Another construction may use multiple tongues and grooves.

In the preferred embodiments, the axle tips protrude far enough through frame sidewalls to facilitate removal of in-line skate wheel incorporating the present invention, but not so far that axle tips or the axle itself can suffer any appreciable wear. The tips may be rounded to facilitate installation and removal of in-line skate wheel incorporating the present invention.

Accidental release of an in-line skate wheel due to loose bolts, for example, could cause injury. The present invention guards against this in two ways. First, both tips must be depressed simultaneously and completely and, at the same time, the user must pull the wheel out and away from the axle apertures or holes in order to remove the wheel.

Second, in a preferred embodiment, the compression spring 18, though not so strong as to make depression of the tips impossible for an average user, is strong enough to resist incidental depression, or to force the tips back into place before they can slip from axle holes unintentionally. The spring is designed, as known in the art, to provide an adequate force for the present invention, and, contrasted to known prior art designs, the present invention never needs tightening. The present invention thereby solves the problem of accidental release better than known prior art.

The materials needed for all the various parts of the present invention are similar to those now used in the field. The friction material of the wheel part that impacts the pavement, the plastics used for the wheel housing and the steels involved are those presently being used in this industry. Any lubrications, bushings, ball bearings and other rotating mechanisms and ancillary requirements are similar to those commonly used in the industry, including but not limited to titanium, aluminum alloys such as #6061, brass and steel.

It will now be apparent to those skilled in the art that other embodiments, improvements, details and uses can be made consistent with the letter and spirit of the foregoing disclosure and within the scope of this patent, which is limited only by the following claims, construed in accordance with the patent law, including the doctrine of equivalents.

What is claimed is:

1. An axle defining a longitudinal axis for in-line skate wheels, the wheels mounted within frame extensions, the frame extensions having opposing apertures wherein each wheel has a through hole centrally positioned to accept the axle, and wherein each wheel is arranged between frame extensions, the axle comprising:

a first structure having a first distal end and a second structure having a second distal end, at least a portion of the first structure overlapping at least a portion of the second structure, the first and second distal end retainable in a corresponding aperture in the frame extension, means for retaining the first structure to the second structure preserving the overlap thereby preserving the integrity of the axle, the first and second distal ends moveable relative to each other along the longitudinal axis of the axle, spring means for biasing the first and second distal ends into the opposing apertures.

2. The axle as claimed in claim 1 wherein the means for biasing comprises spring means for biasing the ends apart.

3. An axle for in-line skate wheels defining a longitudinal axis, the axles having a pair of distal ends, the wheels mounted within frame extensions, the frame extensions having opposing apertures wherein each wheel is arranged between frame extensions and the distal ends of the axle are retained in opposing apertures in the frame extensions, the axle comprising:

a tube with open ends, the tube having a length to fit between the frame extensions at said apertures, said tube defining an inner chamber, a retaining structure constructed within the inner chamber of the tube, spring means having a pair of distal ends and first and second caps connected to the distal ends of the spring means, wherein said spring means urges said end caps apart in a direction generally along the longitudinal axis, each of the caps extending through the ends of said tube, each cap receivable by the opposing apertures in said frame extension, the first and second caps having a shoulder contactable with the retaining structure limiting the extent of travel of the first and second caps along the longitudinal axis.

4. The axle of claim 3 wherein said retaining structure is a lip around the inner surface of the inner chamber and the shoulder is a mating flange extending from said end caps and further comprising means for rotatably attaching the axle to a wheel hub to define a wheel assembly.

5. A method of mounting and removing a wheel with a two part telescoping axle from an in-line skate frame structure, the wheel rotatable supported within the frame structure by an axle, the method comprising the steps of:

provhiding a pair of depressible distal ends on the axle extending through apertures in the frame structure, telescoping the two parts of the axle together by depressing the distal ends of the axle of the wheel, slipping said wheel from said frame structure when said ends of the axle clear the inner surfaces of said frame structure, depressing the distal ends of the axle of the wheel, slipping said wheel into said frame structure when said ends of said axle clear the inner surfaces of said frame structure wherein said axle integrity is preserved when said wheel is removed from the blade frame, depressing the distal ends of the axle of the wheel, and slipping said wheel into said blade frame when said ends of said axle clear the inner surfaces of said frame structure.

6. The method of claim 5 wherein the axle is slipped into the apertures from the outside of the frame after the wheel has been placed and aligned between the frame apertures.

* * * * *